(12) United States Patent
Guerra Johansson

(10) Patent No.: US 12,372,408 B2
(45) Date of Patent: Jul. 29, 2025

(54) AERIAL MARINE DRONE SYSTEM AND METHOD

(71) Applicant: Omar F Guerra Johansson, Fort Lauderdale, FL (US)

(72) Inventor: Omar F Guerra Johansson, Fort Lauderdale, FL (US)

( * ) Notice: Subject to any disclaimer, the term of this patent is extended or adjusted under 35 U.S.C. 154(b) by 551 days.

(21) Appl. No.: 17/833,488

(22) Filed: Jun. 6, 2022

(65) Prior Publication Data

US 2023/0046127 A1 Feb. 16, 2023

Related U.S. Application Data

(60) Provisional application No. 63/232,570, filed on Aug. 12, 2021, provisional application No. 63/197,373, filed on Jun. 5, 2021.

(51) Int. Cl.
| | |
|---|---|
| G01J 5/00 | (2022.01) |
| H04N 7/015 | (2006.01) |
| H04N 7/18 | (2006.01) |
| B64U 10/14 | (2023.01) |
| B64U 10/60 | (2023.01) |
| B64U 30/20 | (2023.01) |

(Continued)

(52) U.S. Cl.
CPC .............. *G01J 5/00* (2013.01); *H04N 7/015* (2013.01); *H04N 7/183* (2013.01); *B64U 10/14* (2023.01); *B64U 10/60* (2023.01); *B64U 30/20* (2023.01); *B64U 80/70* (2023.01); *B64U 80/84* (2023.01); *B64U 2101/20* (2023.01); *B64U 2101/32* (2023.01); *G01J 2005/0077* (2013.01); *G06F 3/0482* (2013.01)

(58) Field of Classification Search
CPC .... G01J 5/00; G01J 2005/0077; G01J 5/0205; G05D 1/0038; H04N 7/015; H04N 7/183; H04N 7/185; B64U 10/14; B64U 10/60; B64U 30/20; B64U 80/70; B64U 80/84; B64U 2101/20; B64U 2101/32; B64U 2101/35; G06F 3/0482
See application file for complete search history.

(56) References Cited

U.S. PATENT DOCUMENTS 11,711,135 B1 * 7/2023 Gajjar ................... H04B 7/155
 370/316
11,999,476 B1 * 6/2024 Dao ........................ H01Q 1/28
(Continued)

*Primary Examiner* — Donald J Wallace
(74) *Attorney, Agent, or Firm* — Melvin K. Silverman

(57) ABSTRACT

A marine drone system utilizing an unmanned aerial vehicle to provide visual feedback for conditions including temperature, depth, and conditions which may suggest favorable fishing conditions, such as weed lines, flotsam, breaks, and objects, such as birds or fish. The system utilizes a plurality of sensors, including, but not limited to, cameras, laser, GPS, radar, and LIDAR. The visual feedback may be shown as a video fees or a map, wherein the feedback is shown as a visual backgrounds, wherein an overlay of interactive functions provides information regarding the conditions. The system also includes method steps for implementing, obtaining, and displaying the information. The system hardware includes the unmanned aerial vehicle, a base station, and a hardwired tether between the unmanned aerial vehicle and the base station providing power and bi-directional data transfer.

15 Claims, 13 Drawing Sheets

(51) Int. Cl.
*B64U 80/70* (2023.01)
*B64U 80/84* (2023.01)
*B64U 101/20* (2023.01)
*B64U 101/32* (2023.01)
*G06F 3/0482* (2013.01)

(56) References Cited

U.S. PATENT DOCUMENTS

| | | | | |
|---|---|---|---|---|
| 2017/0069214 | A1* | 3/2017 | Dupray | G08G 5/0008 |
| 2018/0050798 | A1* | 2/2018 | Kapuria | B64F 3/02 |
| 2018/0118374 | A1* | 5/2018 | Lombardini | B64F 3/02 |
| 2018/0233007 | A1* | 8/2018 | Williams | A61K 31/55 |
| 2019/0018143 | A1* | 1/2019 | Thayer | G01S 17/89 |
| 2020/0225684 | A1* | 7/2020 | Anderson | B64U 70/95 |
| 2021/0055418 | A1* | 2/2021 | Hopper | G01S 7/4816 |
| 2021/0241636 | A1* | 8/2021 | Yu | G08G 5/0026 |
| 2022/0301302 | A1* | 9/2022 | Murphy | B64U 80/84 |
| 2022/0413113 | A1* | 12/2022 | Fluhler | G08G 5/0069 |

\* cited by examiner

AERIAL MARINE DRONE SYSTEM AND METHOD

CROSS-REFERENCE TO RELATED APPLICATIONS

This application claims the benefit or priority under 35 USC 119(e) of provisional patent application Ser. No. 63/197,373 filed Jun. 5, 2021, and provisional patent application Ser. No. 63/232,520 filed Aug. 12, 2021, all of which is incorporated by reference in its entirety

FIELD OF INVENTION

The invention generally relates to unmanned aerial vehicles and associated control software used in marine applications.

BACKGROUND

When trolling lures and baits for fish in the ocean, the skilled fisherman looks for certain indicators that his targeted game fish are present. Birds overhead may indicate that the birds are scouting out baitfish. When the birds are hitting the water, there is an indication that baitfish are below, jumping into the air to avoid a predator game fish. A fisherman may look for these breaks in the water surface and birds overhead to identify areas to fish.

Another condition a skilled fisherman will look for is a weed line, because baitfish use the weed lines to seek security from a preying game fish. These weed line indicate that game fish are near. Flotsam or debris floating is also another condition that attracts fish.

Fishing technology has remained relatively unchanged as it pertains to fish-spotting applications. Tuna towers are widely used in sport fishing to obtain a better view of water conditions, indicating where fish may be. The towers allow for seeing greater distance, but also allow fisherman to spot fish deep down behind the boat in the spread. However, tuna towers come with their own setbacks. Many of them are located on larger sport fishing vessels, and not on the average center console boat a fisherman may bring trailer in for a single day out on the water. Further, the ladders to get up to a traditional tuna tower may prove too burdensome for individuals with impaired climbing mobility. Further, tuna towers are limited to a maximum height before the watercraft and tower could become unstable.

With the growing availability of drone technology, new opportunities present themselves in the marine industry. However, a simple drone may not be suitable for the conditions of full-day sport fishing, which would require certain power requirements, navigation capabilities, and sensor technology; a solution which is not yet available. Thus, there exists a need in the industry for a drone system capable of assisting fisherman and watercraft operators and providing features to enhance identification of optimal finishing conditions.

SUMMARY

The invention herein provides a method for a marine drone system. This method includes providing a marine drone system including an unmanned aerial vehicle and a control module with screen and graphic user interface. The method further includes displaying a menu on said graphic user interface that includes interactive locations for: displaying a video feed, displaying depth information from a LIDAR output, displaying temperature information from an infrared camera output; and displaying a map, and selecting at least one of said interactive locations on said graphic user interface. The method also includes displaying a water temperature when said location on said graphic user interface for water temperature is tapped, displaying water depth when said location on said graphic user interface for water depth is tapped, displaying objects when said location on said graphic user interface for objects is tapped, and displaying an HD video feed when said location on said graphic user interface for HD video feed is tapped.

The invention herein also provides an electronic device for a marine drone system, comprising a processor and a memory. The memory contains instructions stored thereon, wherein said instructions, once executed perform the steps of: initiating a hover mode of flight, selecting at least one mode including following mode and sense mode, and obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface. The instructions further include the steps of providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera. Additionally included are the steps of displaying on a screen of a graphic user interface includes said output from said follow mode and said output from said sense mode. The displaying on said screen further includes displaying said output from said follow mode or said output mode as an overlay layer with at least one of a map or a camera feed as a background layer. The steps of identifying objects displayed on said screen and tapping, by way of user interaction, a screen location representing said object are also included. Lastly, the steps include selecting from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen.

The invention herein also provides a marine drone system comprising a container configured to be mountable on an upper surface of a watercraft, wherein said container further includes a means of supplying power to components of said marine drone system, an unmanned aerial vehicle, a tether coupling said unmanned aerial vehicle to a said container, and a control module with screen and graphic user interface.

It is an objective of the invention to provide a marine drone system that is capable of acting as a virtual tuna tower to identify, among other things, conditions favorable to fishing through visual feedback of objects, temperatures, and depth information, without the need for a physical tuna tower.

It is another objective of the invention to provide a self-contained system that is easily installed on a watercraft that includes an unmanned aerial vehicle, a control unit such as an interactive screen, and provides power and storage for the components therein.

It is yet further an objective of the invention to provide a program to run on the control unit of the invention that provides an interactive means of monitoring temperature, depth, objects, and flight data for a drone through use of multiple visual layers on a graphic user interface.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete and fully convey understanding to those skilled in the art. The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

The present invention provides an advance solution to identifying ideal fishing location while on a watercraft. The solution includes a container configured to be mountable on an upper surface of a watercraft, wherein the container further includes a means of supplying power. The system also includes an unmanned aerial vehicle having a weather-proof and water-proof casing, a plurality of sensors coupled to the unmanned aerial vehicle, including at least one camera, at least one infrared camera, at least one radar module, at least one LIDAR module, at least one GPS module, and at least one bathymetric sensor, at least one laser module and a plurality of propellers capable of lifting the unmanned aerial vehicle and supporting the weight of the unmanned aerial vehicle and a tether. Many of the sensors and various instruments (video, IR, etc.) will detect objects (weed lines, birds, etc.,) and the laser will be used to detect the location and return this information in the form of a GPS coordinate location, which may be displayed by the system. The system includes a tether, wherein the tether includes electrical supply wiring and data wiring. The tether couples the unmanned aerial vehicle to the container, wherein the tether supplies the unmanned aerial vehicle with power through the electrical supply wiring, and provides for a bi-directional communication link through the data wiring. The system includes a control module having an interactive graphic user interface, configured to execute a program configured to show a video output, show a visual radar output, show a visual LIDAR output, show a GPS location of the unmanned aerial vehicle, and show a GPS location of the graphic user interface. The control module including means for relaying information between the unmanned aerial vehicle and the interactive graphic user interface and the control module including a network uplink for uploading identification information on fishing conditions.

Figure 1:
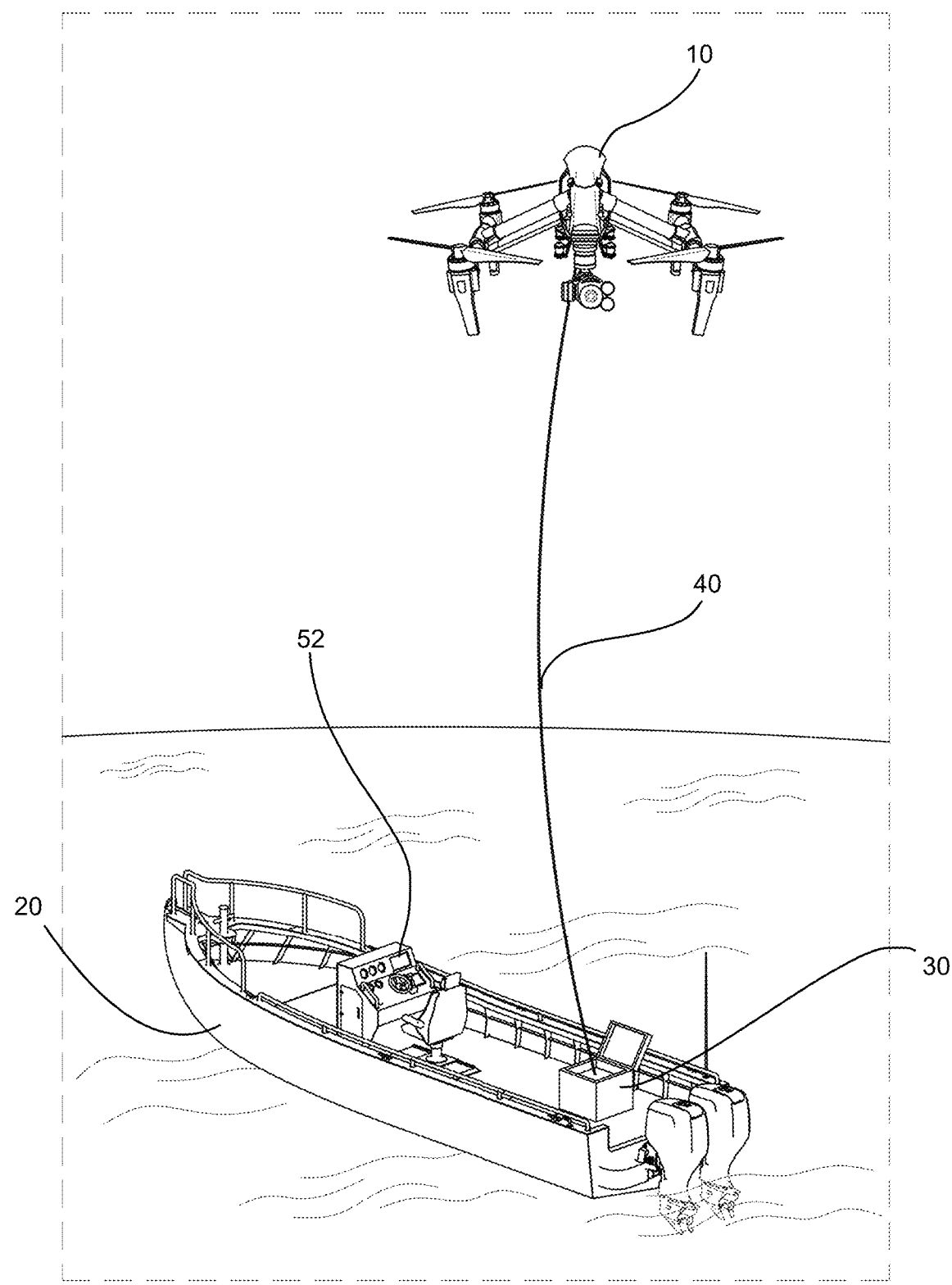
FIG. 1 is a conceptual view of the aerial marine drone system in operation.

This general layout is illustrated in FIG. 1, and may be seen in more detail in FIGS. 2-7. The invention provides for an unmanned aerial vehicle (UAV) 10, also known as a drone, that is capable of lifting itself, as well as a plurality of sensors. The UAV 10 is coupled to a tether 40, which provides both a data link and power to the UAV 10. On a distal end of the tether from said UAV is a base 30.

The base 30 includes a power source 140 for the UAV 10, and a UAV garage 34 to contain the UAV 10 when it is not in flight. This base 30 encapsulates the UAV 10 and protects it from the elements. The base 30 may include its own power supply, such as a battery or solar, or be wired in to the watercraft's electrical source, which may include at least one of its own battery or at least one generator. The base 30 is mountable on a watercraft 20 to ensure additional security to ensure the base 30 does not fall overboard. The base 30 can be mounted in convenient locations to remain effective, but free from potential obstructions. Therefore, the base 30 also communicates with an interactive screen module 52 with graphic user interface (GUI) 50, as may be appreciated in FIGS. 1 and 7-13.

The screen module 52 may be wired directly to the base 30, or, in configurations where the base 30 is out of reach, such as on a tuna tower, the screen 52 may communicate wirelessly. Some embodiments may also include a screen 52 that is wired into the electronics cluster on a console of a watercraft 20, alongside other sensors and watercraft equipment. The screen module 52 displays information, as shown in FIGS. 9-13, sent from a plurality of sensors (Elements: 106-112, and 116-126) aboard the UAV 10.

The UAV 10 may include at least one camera 106/108 (including a camera high-definition camera 106, and a camera with nighttime viewing options using infrared technology 108), an infrared thermal sensor, which may also be coupled to a camera 108, a GPS module 120, a phased array radar 118, a LIDAR sensor 112, a bathymetric sensor 116, and a laser 110. The combination of these devices will measure, obtain data, and compile the results in to various views displayed on the screen 52 at the watercraft 20.

Figure 9:
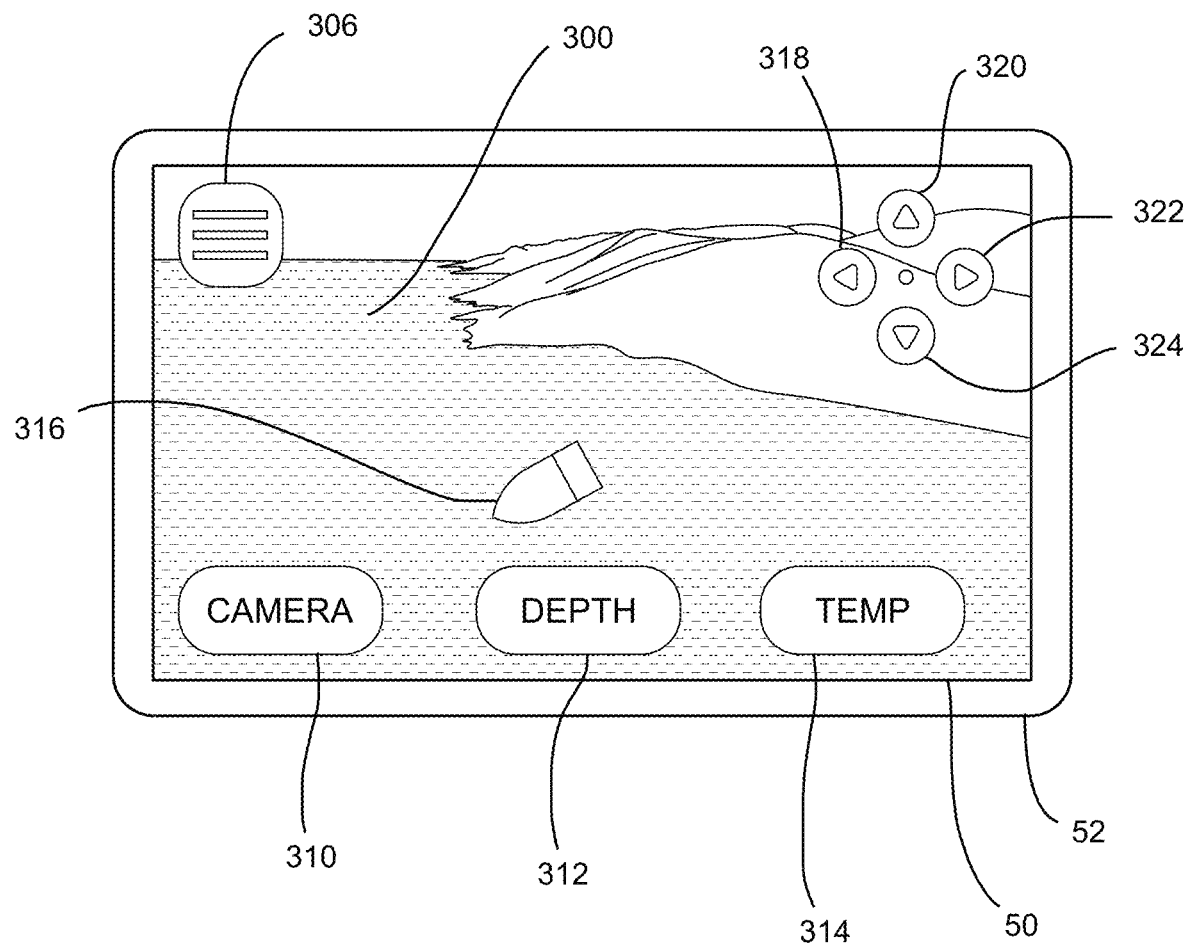
FIG. 9 is a screen layout of a graphic user interface illustrating functionality with a video feed background.
Figure 10:
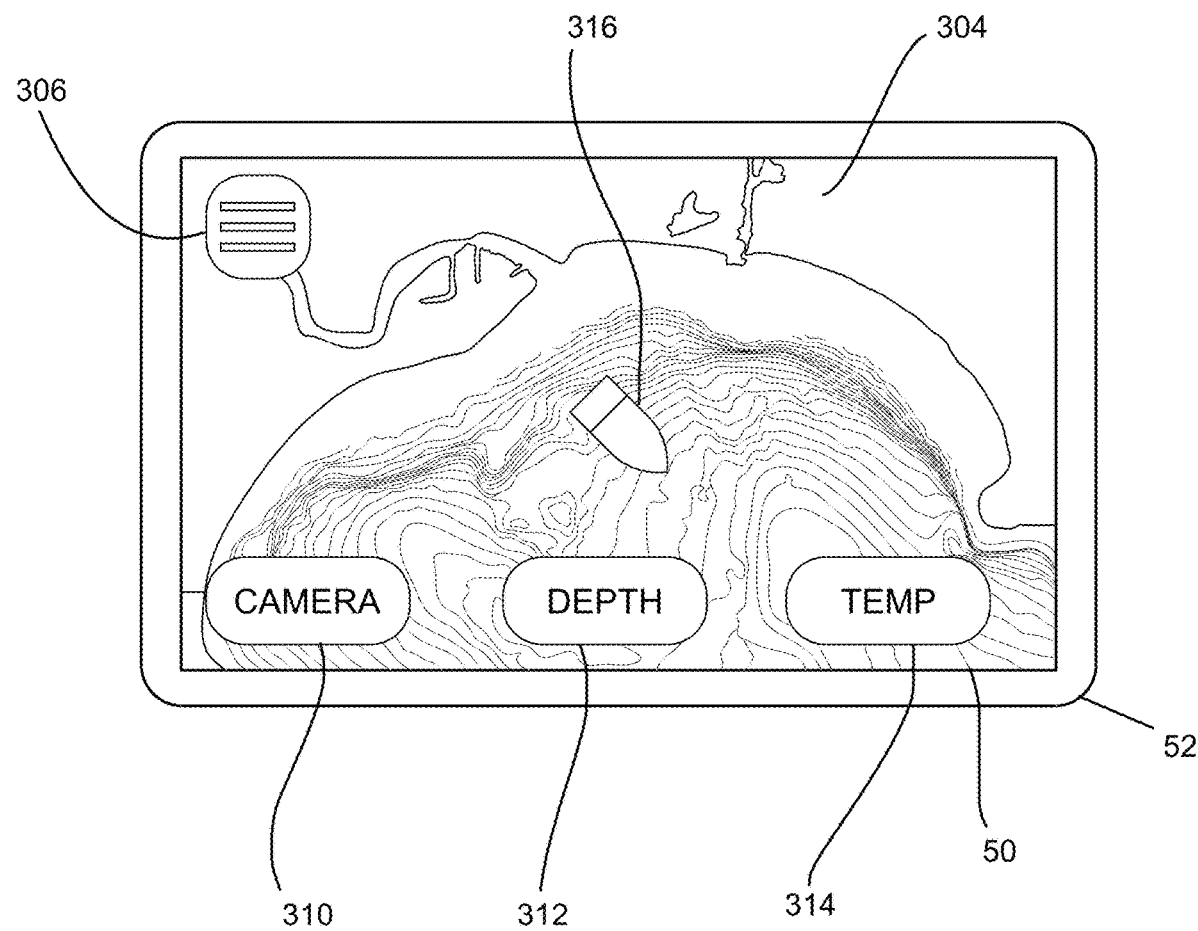
FIG. 10 is a screen layout of a graphic user interface illustrating functionality with a depth information background.
Figure 11:
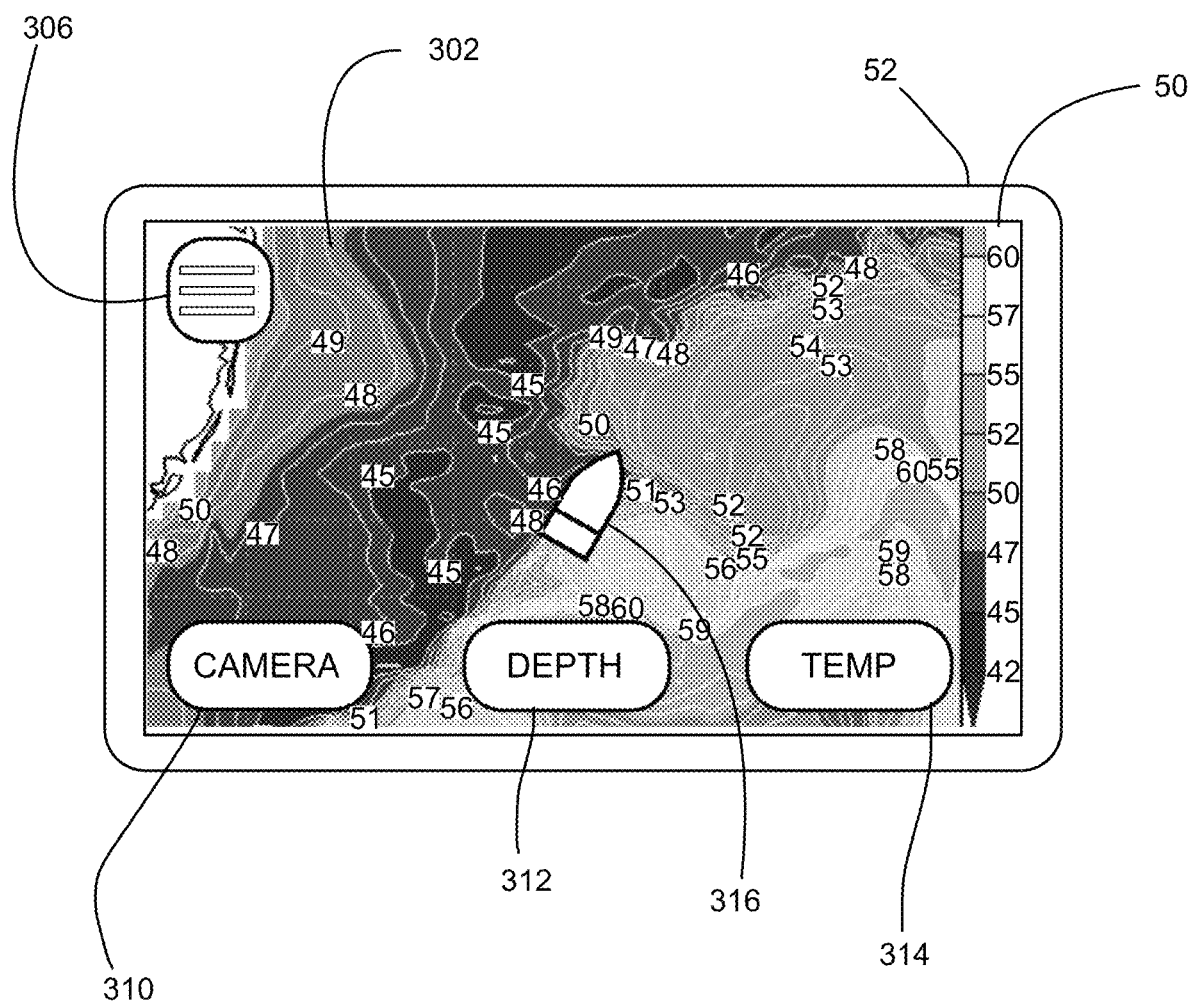
FIG. 11 is a screen layout of a graphic user interface illustrating functionality with a temperature gradient background.

At least one high-definition camera 106 is included in the invention. This camera 106 is mounted to the bottom of the UAV 10 and provides a live aerial view 300, as shown in FIG. 9, of the surrounding area. This live view can also be combined or overlaid with information from other sensors, such as a temperature gradient 302 as shown in FIG. 11, depth information 304 as shown in FIG. 10, and indications of objects and other conditions, as may be appreciated in FIGS. 12-13. Further, the camera 108 may also work with infrared lights to provide nighttime vision of the surrounding area for low-light settings, though it should be appreciated that the strength of the included IR bulbs affects the viewable distance of the nighttime vision. The camera 106/108 may also be used without any overlays if a user wishes to see the conditions of the water and identify them manually, as illustrated by FIG. 13, such as looking for jumping fish, birds, or debris/objects. The camera 106/108 may also be configured for motion detection. The motion detection will need to be able to differentiate between common movements of the water and movements associated with animals and fish.

A thermal sensor, or camera with thermal sensing capabilities 106/108 is mounted to the bottom surface of the UAV 10 to record and relay temperature differences for a user. The user may use this information to view the temperature breaks—the change of temperature of the surface water—shown on the screen 52 to identify fish, as shown in FIG. 11. These temperature breaks assist in the identification of where potential fish may be because baitfish prefer warmer water and often the milkier water provides for safety and low visibility. The temperature break often causes a discoloration in the water and the skilled fisher will spot the color break, which is indicative of the temperature break. The predator game fish prefer the clear and cooler water to sight their prey. Weed lines are often warmer because the weeds hold heat from the sun. So temperature breaks and color breaks are often seen with weed lines. Particular species of game fish prefer different temperatures. Knowing the surface temperature of the water can indicate the species that the keen fisherman can expect, or further, find the water temperature for the species that you want to target, from the UAV's 10 camera 106/108.

Further, once a user has identified an area that should hold billfish temperature-wise, the user should then take into consideration water clarity. A fisherman can get an idea of how clean water in a specific spot is by viewing the latest Chlorophyll images. Chlorophyll is the green material found in plant leaves and phytoplankton (tiny plant-like microorganisms). Phytoplankton is the foundation of the ocean's food chain. Bait fish that large pelagic eat either feed on phytoplankton itself or the small organisms that feed on phytoplankton.

Knowing where phytoplankton blooms are concentrated will give an indication of where baitfish should be concentrated. Billfish prefer cleaner, bluer waters while concentrations of bait will often be found feeding in the greener, off-colored waters that teem with smaller organisms. The boundary areas between blue and green water, often referred to as color breaks, will typically stack up bait and hold above-average numbers of billfish. Temperature breaks and chlorophyll breaks will oftentimes correspond, so once the user locates the general area of a chlorophyll break from viewing the camera 106/108 on the screen 52, and from comparing it to satellite imagery, the user should note the temperature difference on either side of this break (for example 0.2 degrees or 1.5 degrees).

Underwater ledges and/or breaks in the contour of the bottom will often hold baitfish and game fish. Underwater sea mounts will cause the currents to well upward and congregate the bait fish on the nutrients of the currents. Chlorophyll is indicative of the nutrients or plankton sought by the bait fish, attracting the game fish. Knowing the deep drop ledges and humps on the sea floor along with the upwelling of Chlorophyll and plankton can lead to a true hot spot for game fish.

Fisherman often use sonar equipment to map the real time depth of the water and look for drastic shifts in the depth beneath the boat. However, because the current invention is an aerial device, the system herein uses a bathymetric sensor 116 and a LIDAR sensor 112 to create a map of the underwater surfaces. This real time information will correlate with the depth contours preprinted on the chart plotter via GPS 120.

The Bathymetric Sensor 116 is a small UAV-based surveying system for hydrographic applications ideally suited for generating profiles of inland water bodies. The sensor integrates with the UAV 10, providing a compact and lightweight bathymetric depth finder 116 comprising a tilt compensator, an IMU/GNSS unit with antenna, a control unit and up to two external digital cameras 106/108. The bathymetric sensor 116 will be used for sensing the depth contours and ledges as above.

The LIDAR (Light Detection and Ranging) sensor 112 is also used for creating a 3D survey and mapping. Lidar is a remote sensing method used to examine surfaces by pulsing a laser 110 to measure ranges of variable distances to earth. The light pulse from the laser 110, in combination with imaging obtained by the at least one camera 106/108, generates a three-dimensional shape of a surface characteristics. The LIDAR 112 will be used to sense the depth of the water and also map objects such as flotsam and weed lines.

A phased array radar 118 is also included. A phased array radar 118 produces an angular scan of the horizon without mechanical rotation of the antenna. This is accomplished by a voltage dependent phase shift in the antenna elements. The ability to scan the horizon without the use of mechanical rotation is advantageous to the unmanned aerial vehicle 10, which requires a precisely tuned rotor 102 calibration, and excess oscillation from mechanical rotation of one or more of the devices could through the UAV 10 out of control, or reduce the efficiency and precision of the flight. The phased array radar 118 will be calibrated to sense the movement of birds, as well as fish jumping out of the water. Further, the phased array radar may also be used to detect flotsam above the waterline.

The system also incorporates at least one Global Positioning System (GPS) module 120. The UAV 10 will have a multi-functional GPS module 120 that is used to record the location of the UAV 10. One use for the GPS module 120 on the UAV 10 is to keep track of where the UAV 10 is, including its coordinates, so that it may also track where its' base 30 is if the UAV 10 experiences a loss of power and is required to return back to the base station 30. In addition, the UAV's GPS module 120 is used in combination with other sensors to relay coordinates for conditions. That is, the GPS module 120 can relay the coordinates of a bird, fish, flotsam weed line, or similar object. A laser module 110 is used to send a beam of light to detect the exact distance of the object from the UAV 10. Once the distance is calculated, the degree of the beam, and the polar direction of the beam, the GPS module 120 can compile the data and associate it with a set of coordinates, which may then be displayed on the user's screen module 52. This is helpful in detecting exactly where fish are located, as a user will either have a GPS 120 built into the watercraft, or a GPS 142C built into the base 30 and/or screen 52 module.

These sensors 106-112, and 116-126 all work together through a processing module on the UAV 10, or at the base station 30, wherein the processor module 134 compiles the raw data received from the sensors 106-112, and 116-126 to arrange and display useful screen frames, as shown in FIGS. 9-13, on the screen module 52 for the user to implement.

These sensors 106-112, and 116-126 allow the system to have a comprehensive survey of the area around the watercraft 20. This information is displayed on the GUI 50 of the screen module 52, however, may also be uploaded to a server by a network uplink through the communication module 130 or network connection module 142, whereby the information can be processed and also relayed to other user's systems and displayed on their GUIs. This allows more information than what a single UAV 10 is able to compile, and provides an abundant amount of information on fishing conditions. The network uplink may be a module located on the UAV 10, base 30, or screen module 52, depending on application. The UAV 10 may be a potential location if a higher altitude is needed for a better signal. In some embodiments, the network uplink is tied in with the watercraft's 20 internet source. Further, in some embodiments, the screen module 52 may be a user's mobile device, such as a smartphone, with its own network connection.

When viewing the control software on the screen 52, there will be a home screen displayed on the graphic user interface 50 with a vessel 316 in the middle of the screen 52 and a function to allow for the background to be in a true north orientation or relative orientation.

Figure 12:
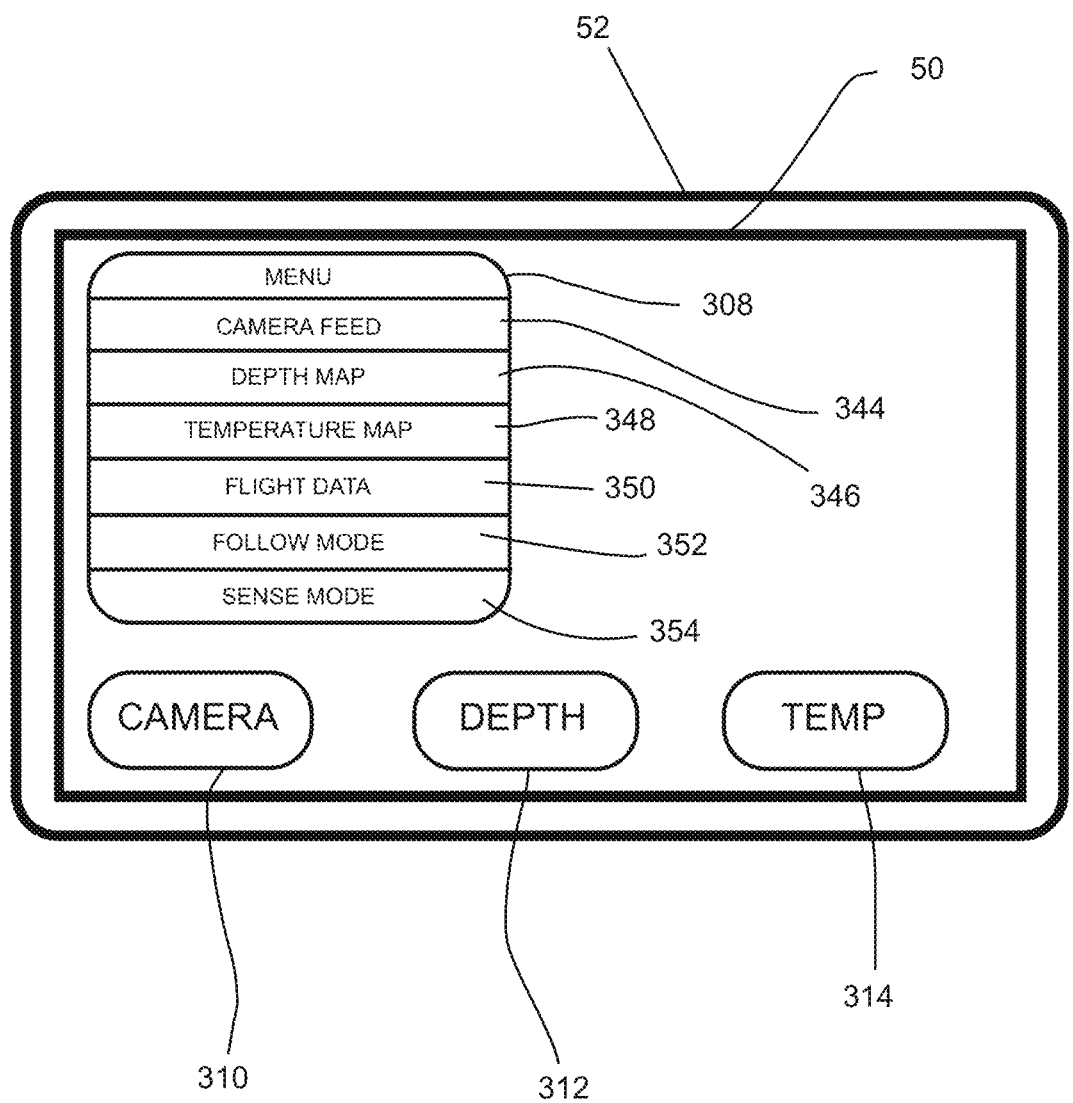
FIG. 12 is a screen layout of a graphic user interface illustrating functionality with expanded menu displayed.
Figure 13:
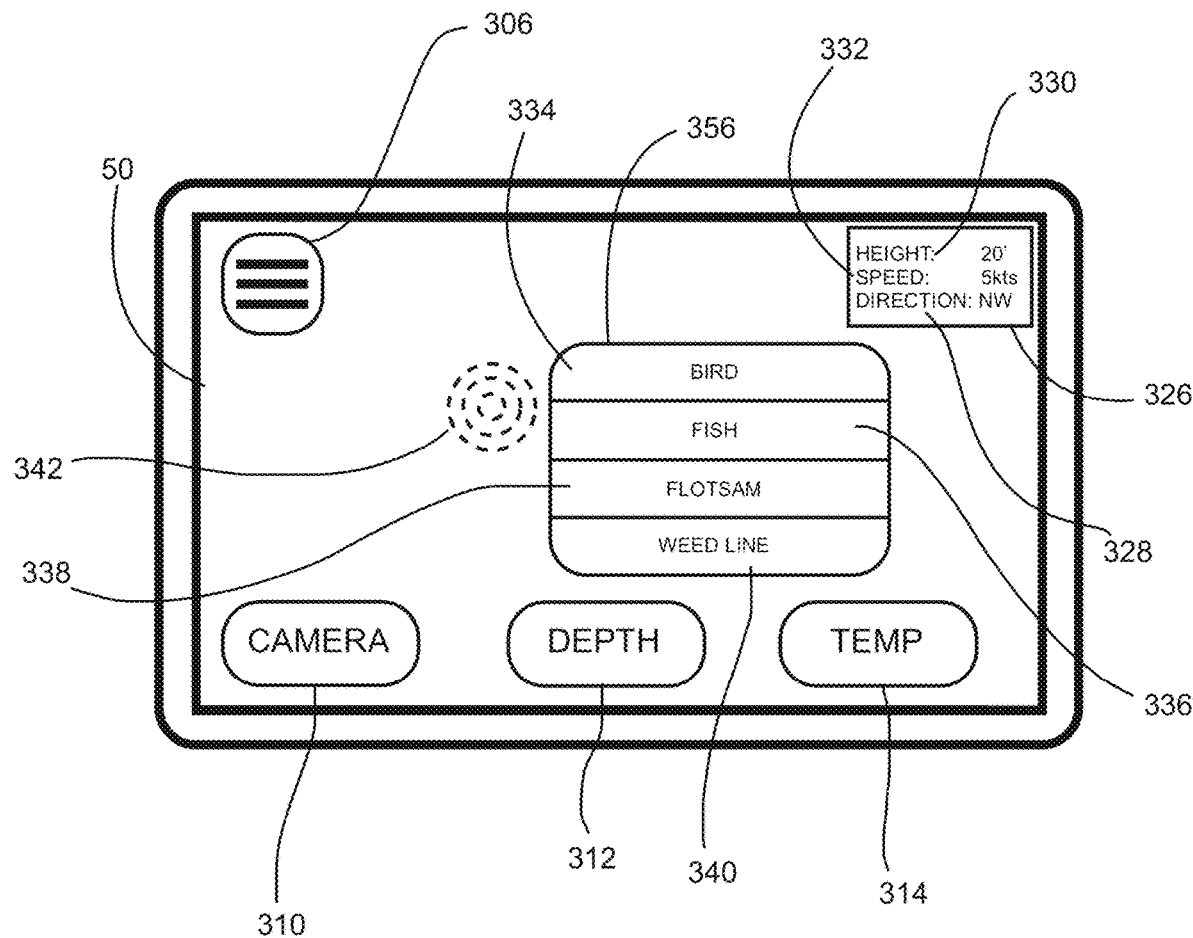
FIG. 13 is a screen layout of a graphic user interface illustrating functionality including interactive tapping, tap interaction menu, and flight data.

A menu button 306 may be selected to provide a list 308 of interactive options including camera feed function menu button 344 depth map function menu button 346, temperature map function menu button 348, flight fata function menu button 350, follow mode/fish-on mode function menu button 352, sense mode function menu button 354, as may be seen in FIG. 12. From the list of interactive options 344-354 available to a user, an HD Video Screen is selectable. This function calls to the Pan-Tilt-Zoom (PTZ) HD Camera 106/108 on the tethered drone 10, and displays it on the screen 52. The screen 52 will primarily show video 300 of what the PTZ HD Camera 106 is viewing, as shown in FIG. 9. The video feed 300 will include a graphic overlay for directional controls 318-324 of the camera 106, including controls for rotation right 322 and rotation left 318 as well as up angle 320 on the camera 106 and down angle 324 on the camera 106. Included in another graphic overlay on the screen 52 will be flight data 326 as shown in FIG. 13, including but not limited to height 330 of drone 10 and sensors, and GPS speed 332 over the ground. The true direction 328 of the camera will also be graphically displayed, which may also be shown on a vertical compass rose in the bottom of the screen 52 or with the remaining flight data 326.

The user can then maneuver the drone 10 to a particular true or relative direction, angle the camera up or down, and using two fingers contacting the screen 52, may zoom in and out by pulling the fingers together to zoom in and spreading the finders to zoom away from a target. In other embodiments, fingers may be spread to zoom out, and pulled in to zoom in. In some embodiments, zooming manipulates the optical zoom on the PTZ HD camera 106, while in other embodiments zoom is digitally accomplished. Some embodiments include the combination of digital and optical zoom.

A user may use the graphic user interface 50 to obtain information on objects, as shown in FIG. 13. Upon viewing an object, the user may tap the screen location 342 displaying the object. This will send a command to the controller 128 in the tethered drone 10 to emit a laser beam from the laser 110 to pinpoint the GPS location for the target by sensing the angulation and direction of the beam and time it takes for the beam to reach the object, whereby the distance may be obtained. By combining the angulation and orientation of the beam and compiling this with the actual distance from the UAV 10, a location of the object relative to the UAV 10 may be obtained, and thereby, a location of the object relative to the vessel 20 may be obtained by comparing the GPS coordinates of the UAV 10 and the vessel 20 in combination with the altitude data received from the altimeter 122, accelerometer 124, and gyro sensor 126, individually or in combination. This location of the object is automatically displayed on the screen 52 of the graphic user interface 50. The user will then select an icon to the right to identify the target. Choices will include a bird indicator button 334, a fish indicator button 336, a flotsam indicator button 338, and a sea grass/weed line indicator button 340, or in some cases a color break indicator button (not shown, but may be in addition to or replace any of the other buttons 334, 336, 338, 340), which may all appear in response to a tap interaction menu 356, which pops up upon initiating a tap to label an object.

The user can pin point a long target at one end and then midsection and the other end. This will identify a series of targets that are perhaps sea grass. The user will then return to the home screen and see a series of targets labeled as sea grass on the chart in true north with the vessel icon 316 operating the tethered drone in the middle. The user can then maneuver his vessel 20 to the target labeled as sea grass. The user will want to continuously update the targets and mark them in the HD Video Screen 52.

For the Infrared Camera 108, the same as above would occur. The heat of the sea grass will be measured by the IR Camera 108 and displayed on the screen, either overlaying a map, as shown in FIG. 11 or an HD camera feed 300, such as FIG. 9. The user can tap a target and identify the target in the IR Video Screen or use the IR Camera 108 to search general for targets of interest and then switch to HD Camera mode to more clearly identify the target and label it.

There will also be a "Fish On" mode that can be enabled from a single button. The tethered drone 10 will lower to twenty feet above the vessel 20 and lock onto the stern of the vessel 20 in a relative direction (now matter the direction of the vessel 20 as it lands the fish) and the HD Camera 106 will automatically begin recoding the action and to a portable microchip card, such as the memory module 136 of the controller 128 of the UAV 10, or separate storage media. This may be seen in steps 202, 206, and 208 of the program of FIG. 8.

In some embodiments, the radar 118 is implemented for identifying objects, wherein the radar output is overlayed on a screen graphic user interface 50, wherein the screen may include a map, such as the map views 302 and 304 seen in FIGS. 10 and 11, or HD video feed 300 from the drone's onboard cameras 106/108. Radar functionality will be similar to IR functionality described above. Radar 118 is ideal for scanning large areas and using the HD Camera 106 to specifically identify a target. The Radar 118 will be tuned to find birds flying above the water line. Once the target is noticed, the HD Camera 106 can then be used to specifically identity the target of interest using a similar method as that above.

In some embodiments, LIDAR 112 is used for measuring depth. The depth of the water can be measured so that the measurements will be labeled on the graphic user interface 50 of the screen 52 to identify a depth visually, as may be seen in FIG. 11. For example, by tapping and labeling a curve of depth at 600 feet, a vessel 20 can use real-time information about the depth of the water ahead of the vessel 20, unlike a conventional sonar that only measures beneath the vessel 20.

Some embodiments include the ability release a fishing line from an interactive control on the screen of the graphic user interface 50. Tapping a release button will actuate the opening of a clip physically affixed to the drone 10 so that a user's fishing line will drop above a designated space, but when the clip is closed, the terminal tackle remains above the water line. In some embodiments, the release of the fishing line will be controlled by tension on the fishing line caused by a predator fish striking the live bait and hook, thereby triggering a sensor on the drone to release the fishing line from the clip.

The graphic user interface will include interactive menus 308/356, that when tapped or manipulated by a user's fingers, will execute commands to the sensors of the drone and return data on the graphic user interface 50 of a user's screen 52. The data may be overlaid on a map 302/304 or live video feed 300, or otherwise displayed on a screen 52.

Figure 2:
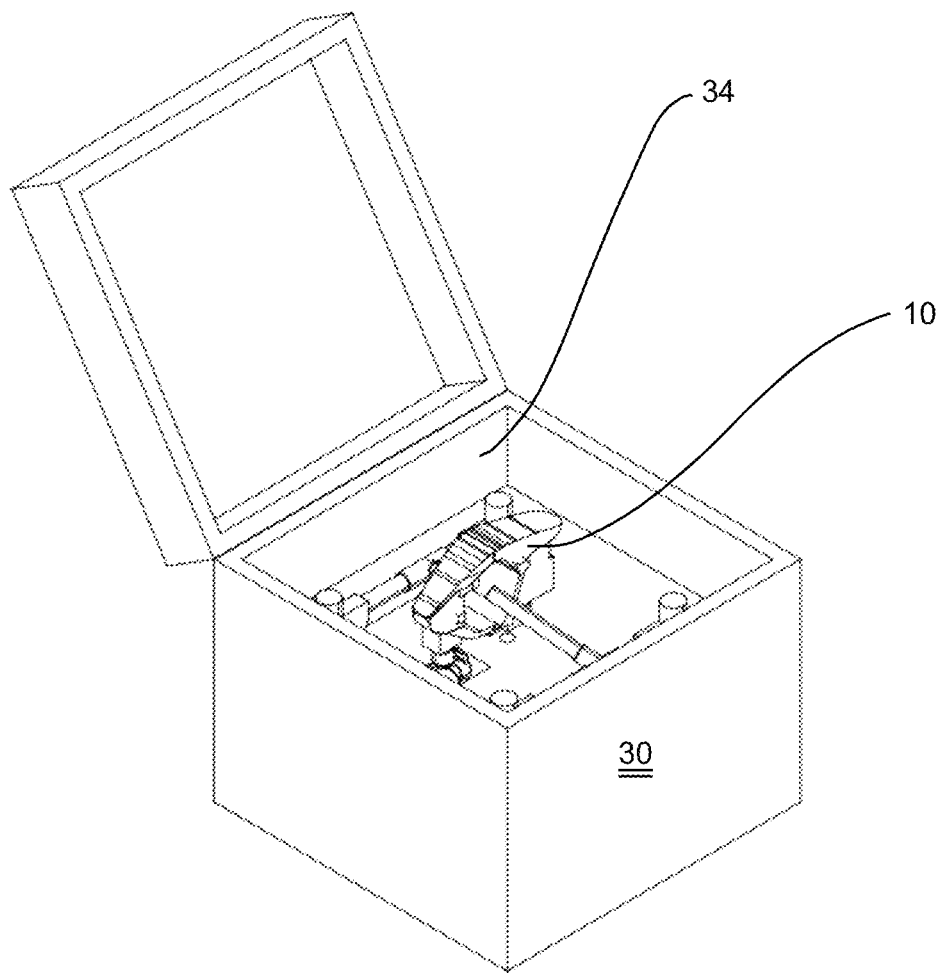
FIG. 2 is an isometric view of the drone housed in the container of the aerial marine drone system.
Figure 3:
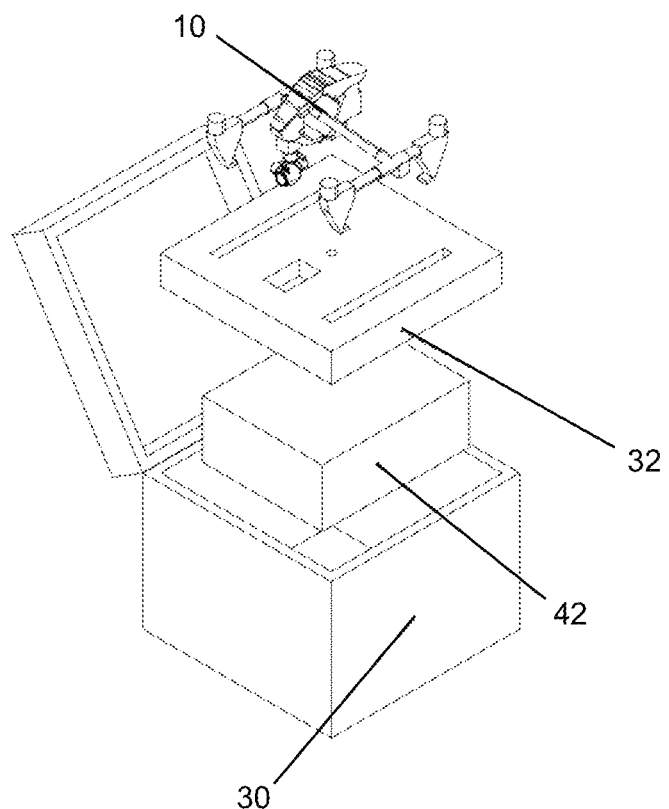
FIG. 3 is an exploded isometric view of the aerial marine drone system illustrated in FIG. 2.

An exemplary embodiment can be seen in FIGS. 1-13. FIG. 1 is a conceptual view of the aerial marine drone system in operation. Shown in the figure are the UAV 10, vessel 20, base station 30, tether 40, and a screen 52 in the console of the vessel 20. FIG. 2 provides a more detailed view of the base station 30. FIG. 2 is an isometric view of the drone 10 housed in the container 30 of the aerial marine drone system. As may be seen, FIG. 2 shows the drone 10, container 30, and garage 34. FIG. 3 is an exploded isometric view of the aerial marine drone system illustrated in FIG. 2. Further shown in FIG. 3 are the integrated landing pad 32 for securing the nested drone 10, and a module for housing the tether, the tether storage system 42.

Figure 4:
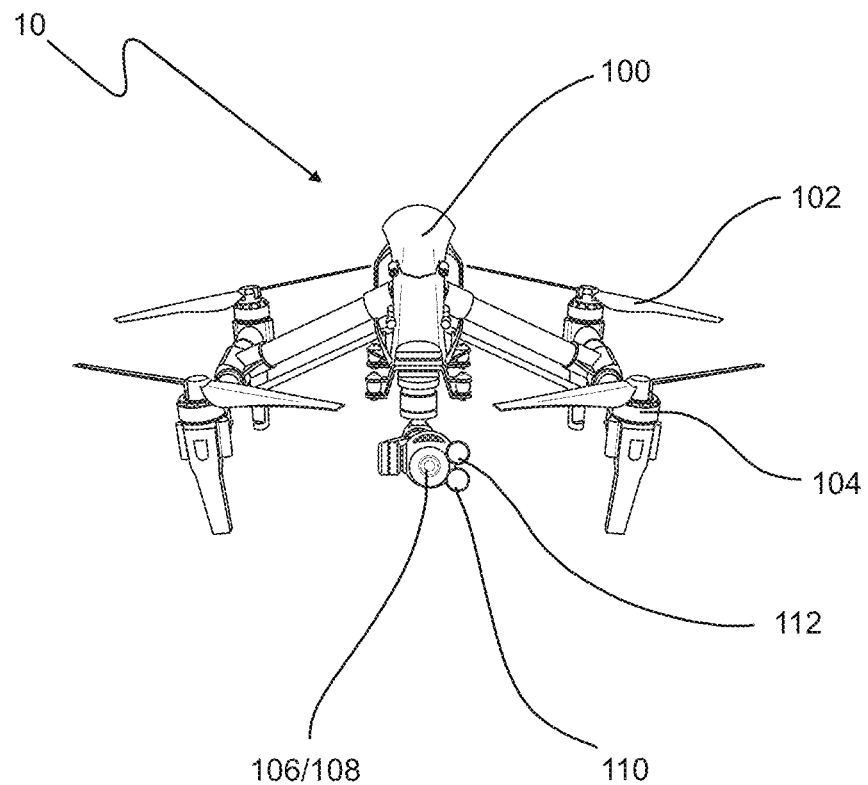
FIG. 4 is a front perspective view of the unmanned aerial vehicle of the aerial marine drone system.
Figure 5:
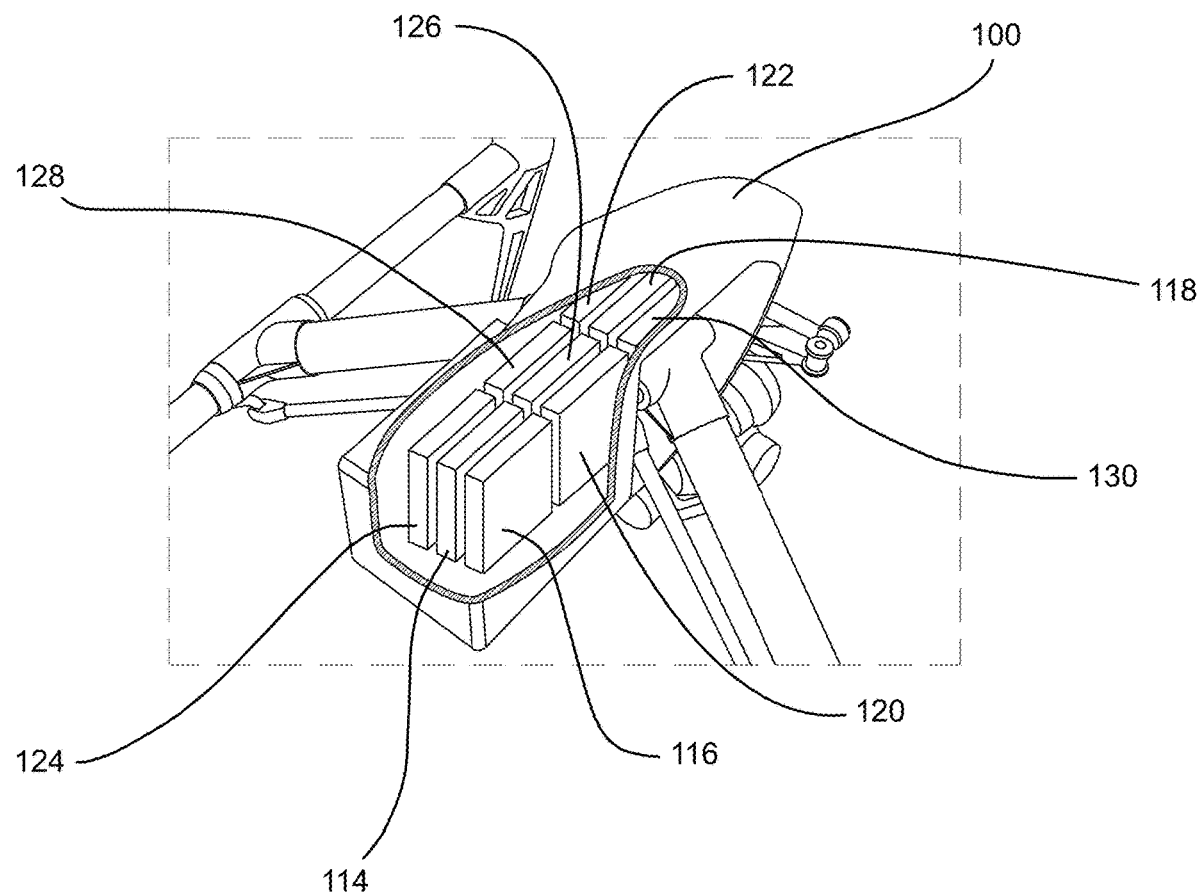
FIG. 5 is an isolated perspective cut-away view of the internal components of the unmanned aerial vehicle of the aerial marine drone system.
Figure 6:
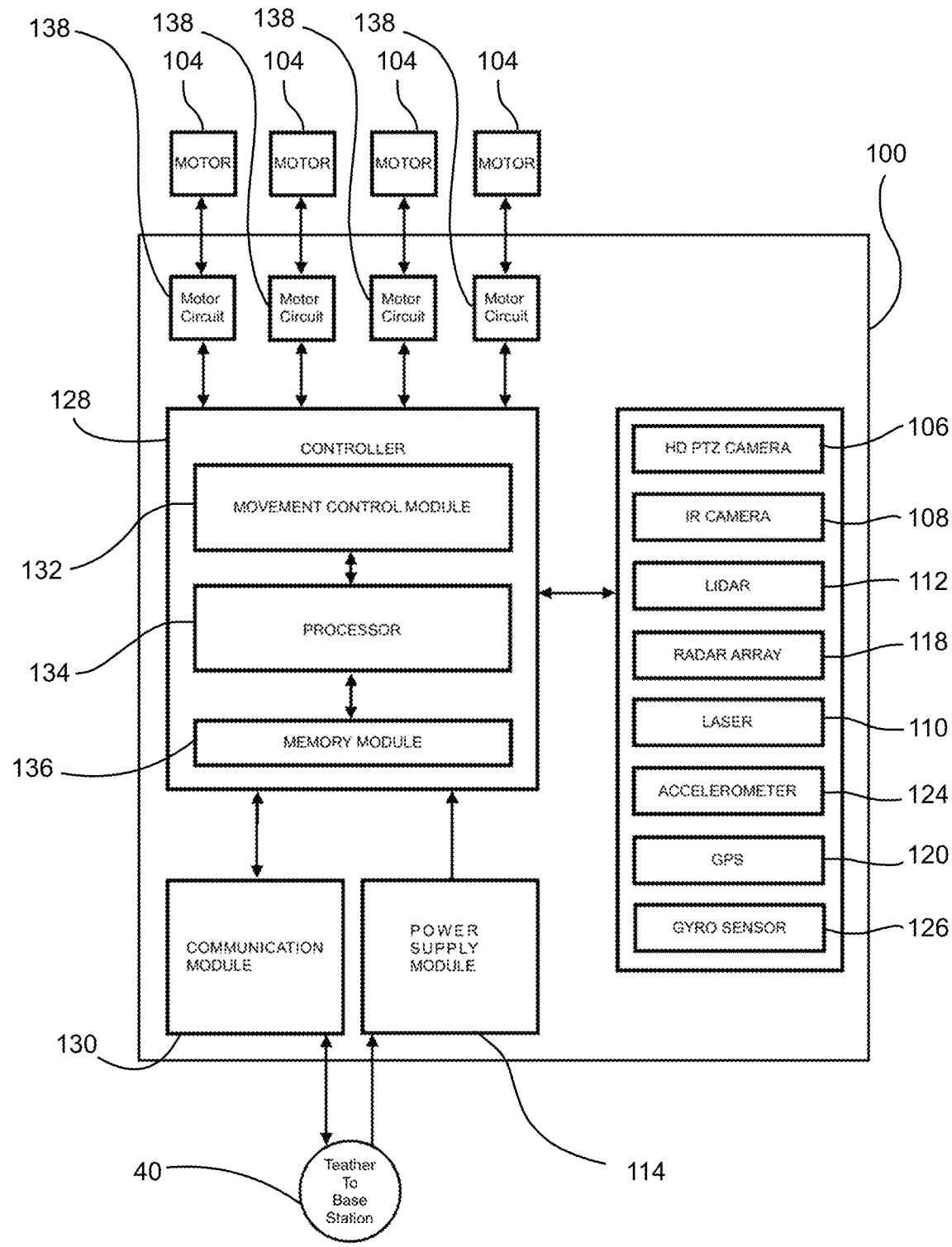
FIG. 6 is a schematic view of the unmanned aerial vehicle of the aerial marine drone system.

The UAV 10 is shown in more detail in FIGS. 4-6. FIG. 4 is a front perspective view of the unmanned aerial vehicle (UAV)/drone 10 of the aerial marine drone system, and can be seen to include a main housing 100, rotors 102, motors 104, An optical/sensor component of the LIDAR sensor 112 or bathymetric sensor, the laser 110, and at least one of the camera systems 106/108. FIG. 5 is an isolated perspective cut-away view of the internal components of the unmanned aerial vehicle 10 of the aerial marine drone system showing the internal components inside the drone housing 100, including, but not limited to, the battery 114, the bathymetric sensor components 116, the radar 118, the GPS module 120, the altimeter 122, the accelerometer 124, the gyro sensor 126, the controller 128, and the communication module 130.

Moreover, FIG. 6 illustrates a schematic view of the unmanned aerial vehicle 10 of the aerial marine drone system so that the internal components may be appreciated. Shown is a controller 128 having a movement control module 132, processor module 134, and memory module 136. The controller 128 is coupled to the communication module 130, power supply module, 114, and a plurality of motor circuits 138, each controlling a motor 104. A tether 40 is shown connecting to the communication module 130, and the power supply module 114, whereby the tether 40 supplies both data communication and power. Also coupled to the controller 128 are a plurality of sensors, including the camera 106, IR camera 108, LIDAR 112, radar 118, laser 110, accelerometer 124, GPS 120, and gyro sensor 126.

Figure 7:
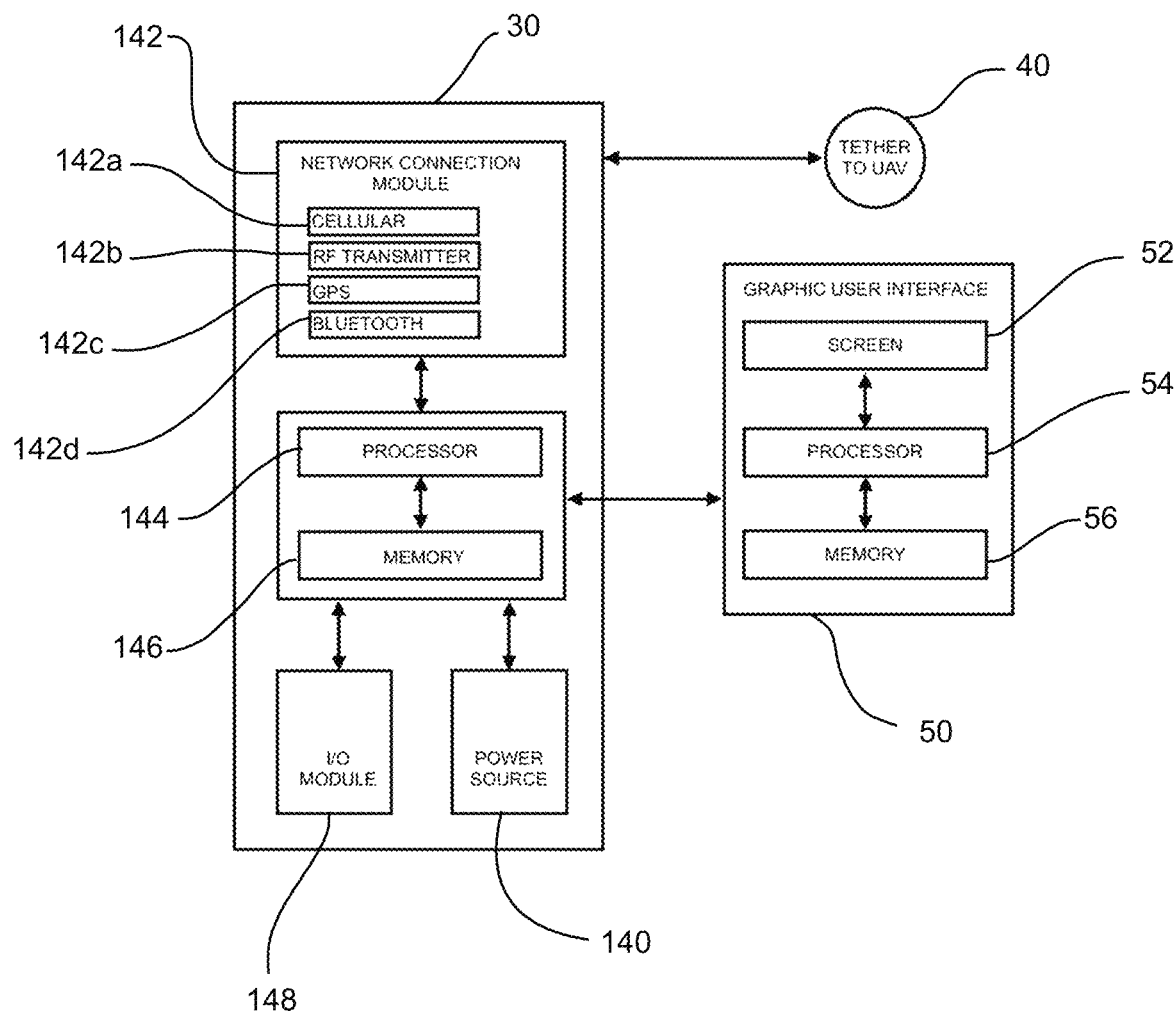
FIG. 7 is a schematic view of the container of the aerial marine drone system.

FIG. 7 is a schematic view of the container base 30 of the aerial marine drone system. FIG. 7 shows a block diagram of the base station 30, including the processor 144 and memory 146, coupled to the network connection module 142, input output (I/O) module 148, power source 140, and a screen 52 with a graphic user interface (GUI) 50. The screen module 52 includes a processor 54, and a memory 56 having an executable software thereon. The network connection module 142 includes means for cellular transmission 142a, RF transmission 142b, GPS location 142c, and Bluetooth capabilities 142d.

Figure 8:
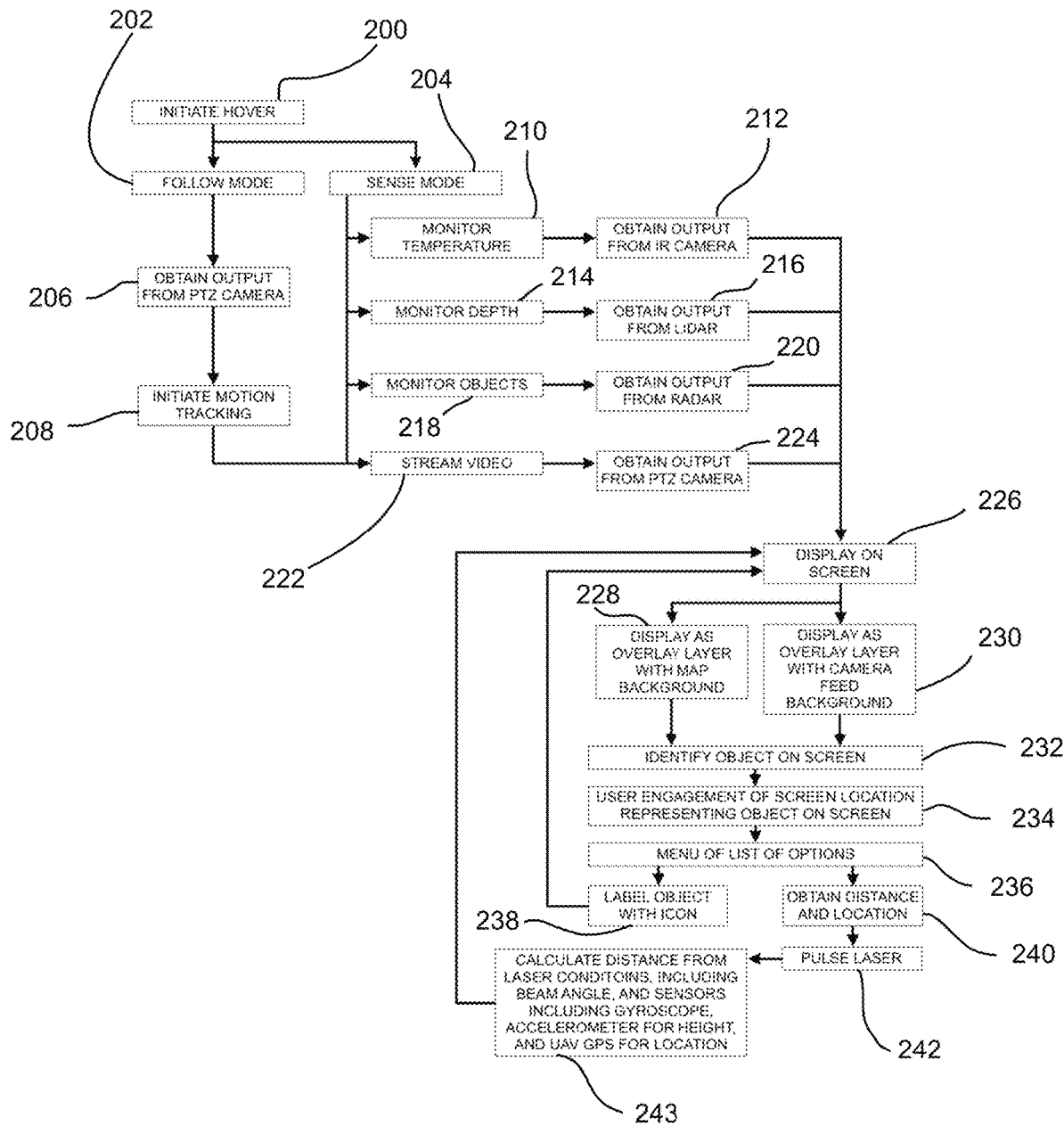
FIG. 8 is a flow diagram of a functional aspect of the aerial marine drone system.

FIG. 8 is a flow diagram of a functional aspect of the aerial marine drone system. Shown are the steps in a method of a system that a user will interact with on the graphic user interface 50. These steps include initiating hover 200, which will allow the UAV 10 to take of from its base station 30. A user will then select a "follow" mode 202 or a "sense" mode 204. Follow mode 202 will follow the craft 20 and record, for example, when a user is fishing, to capture video of the experience, sometimes referred to as "fish-on mode". The "follow" mode 202 initiates a tracking program which obtains 206 a video feed from the PTZ camera 106 and uses object identification to identify and lock on to the watercraft 20 and follow physically and in the camera view in an initiated motion tracking function 208. The video feed 300 is then streamed 222 from a camera output 224, displayed 226 on the screen 52, the user can then interact with the graphic user interface, wherein the display may be overlayed as a layer with a map background 228 or displayed as an overlay layer with camera feed background 230. With the mode 228/230 selected, a user may identify an object 230 on the graphic user interface 50 displayed on the screen 52. Next, a user may tap an object engaging a screen location representing the object 234. Upon tapping the object, a tap interaction menu 356 populates on the GUI. From the list, the user may select a label populated 238 in the menu 356, or obtain a distance and location 240 by pulsing 242 the laser 110. Form the laser pulse, the program will calculate 243 the distance from the laser 110 conditions, including beam angle and sensors including the gyroscope 126, accelerometer 124 for height, and the GPS 120 for location of the UAV 10.

The "sense" mode 204 will provide a list of options for a user to select, including options to monitor water temperature 210, monitor water depth 214, monitor objects in the water and air 218, and stream live video 222. If a user selects to monitor temperature 210, the IR camera is engaged 212, and the data output will be quantified into visually viewable data on the screen of the GUI 226. If depth monitoring 214 is selected, the system will obtain an output from a LIDAR 216 and the data output will be quantified into visually viewable data on the screen of the GUI 226. Selecting monitor objects 218 will bring up a feed from a radar array 224 with graphical representations of objects in the viewable area. In most modes, streaming video is integrated into the mode. Streaming video 222 will bring up an output 224 from the PTZ camera 106. Once the video is obtained from the subfunctions 210-224 of the sense mode selection 204, the user can then interact with the graphic user interface as described above in steps 226-243.

Each mode is displayed on the screen of the GUI 226. For most modes, the output of these modes will be through layers, wherein the output will be in a foreground layer, and a background layer may be selected from a live video feed 300, or a map 302-304, by tapping a button from a list of buttons, including a camera button 310, a depth button 312, and a temperature button 314. These buttons 310-314 may be present on the screen as quick tap buttons to move between background layer. In some embodiments, there may also be a quick button for "Fish-On" mode, but in others, "Fish-On" mode, also known as "Follow Mode" 352 will be present in a menu 308. A user can select variable locations on the screen of said GUI 50, which will bring up an option to label an object 356, or receive distance data 326. Selecting obtaining distance 326 will pulse a laser 110 which, when combined with output from other sensors including a gyroscope 126, accelerometer 124, GPS 120, and/or altimeter 122, will allow for the calculation of distance, and location based on the beam angle of the laser 110, orientation, distance, current height of the UAV, and GPS location of the UAV 10.

This functionality can be particularly seen in FIGS. 9-13 as described above. FIG. 9 is a screen 52 layout of a graphic user interface 50 illustrating functionality with a video feed 300 background. FIG. 10 is a screen 52 layout of a graphic user interface 50 illustrating functionality with a depth information 304 background. FIG. 11 is a screen 52 layout of a graphic user interface 50 illustrating functionality with a temperature gradient 302 background. FIG. 12 is a screen 52 layout of a graphic user interface 50 illustrating functionality with expanded menu 308 displayed. FIG. 13 is a screen 52 layout of a graphic user interface 50 illustrating functionality including interactive tapping 324, tap interaction menu 356, and flight data 326.

An exemplary embodiment of the invention provides a marine drone system, as shown in FIG. 1, comprising a container 30 configured to be mountable on an upper surface of a watercraft 20, an unmanned aerial vehicle 10, a tether 40 coupling said unmanned aerial vehicle 10 to a said container 30, and a control module with screen 52 and graphic user interface 50. The control module may be integrated to the screen 50, as shown in FIG. 7, wherein the control module has a screen 52, processor 54, and memory 56. The container 30 further includes a means of supplying power 140 to components of said marine drone system. The control module with screen 52 and graphic user interface 52 includes a processor 54 and a memory 56. The memory 56 contains a program stored thereon that, once executed by the processor provides for the steps of: i) displaying a menu 308 on said graphic user interface 50 that includes interactive locations 310, 312, 314, 344, 346, 348, 350, 352, and 354 for: displaying a video feed 310/344, displaying depth information 312/314 from a LIDAR 112 output, and displaying temperature information 314/348 from an infrared camera 108 output, and displaying a map 302/304, ii) selecting at least one of said interactive locations 310, 312, 314, 344, 346, 348, 350, 352, and 354 on said graphic user interface 50, iii) displaying a water temperature when said location on said graphic user interface for water temperature 314/348 is tapped, iv) displaying water depth when said location on said graphic user interface for water depth 312/346 is tapped v) displaying objects 356 when said location on said graphic user interface for objects 342 is tapped, and vi) displaying an HD video feed 300 when said location 310/344 on said graphic user interface 50 for HD video feed is tapped. The display of this program contained on the memory can be seen in FIGS. 9-13.

In some embodiments, the unmanned aerial vehicle 10, as shown in FIGS. 4-6, of said marine drone system further includes, a weather-proof and water-proof casing 100 and a plurality of sensors 106-112, and 116-126 coupled to said unmanned aerial vehicle 10, including at least one camera 106, at least one infrared camera 108, at least one radar module 118, at least one LIDAR module 112, at least one GPS module 120, and at least one bathymetric sensor 116. The unmanned aerial vehicle 10 also includes a plurality of propellers 102 capable of lifting said unmanned aerial vehicle 10 and supporting the weight of said unmanned aerial vehicle 10 and a tether 40. The unmanned aerial vehicle 10 further includes a laser 110, configured to communicate with at least one sensor in said plurality of sensors 106-112, and 116-126 to obtain information from said sensor, and obtain a GPS coordinate location for objects detected by said at least one sensor and measured by said laser 110.

In some embodiments, the tether 40 includes an electrical supply wiring and data wiring within the overall sheath of the tether 40. The tether 40 supplies said unmanned aerial vehicle 10 with power through said electrical supply wiring in the tether 40, and provides for a bi-directional communication link through said data wiring in the tether 40. While the individual wiring may not be shown in the drawings, it should be appreciated by a person of skill in the art that the individual wires may have their plastic jackets fused together, or may be in a hollow sheath, as is typical in production of data and communication wires, for example, in category wiring.

In some embodiments, as may be appreciated in FIGS. 5-7, the marine drone system further includes at least one control module, such as the processor 54 and memory 56 of the screen 52, providing an interactive graphic user interface 50 on a display 52, wherein said control module 52/54/56 includes a processor 54 configured to execute a program stored on a memory 56, wherein said program is configured to: i) show a video output 300, ii) show a visual radar output (such as an overlay on the maps 302 and 304), iii) show a visual LIDAR output 304, iv) show a GPS location of said unmanned aerial vehicle 10, and v) show a GPS location of said graphic user interface 50. The at least one control module includes means for relaying information between said unmanned aerial vehicle 10 and said display 52 with said interactive graphic user interface 50. For example, the means for relaying information may include the display module 52, the Network Connection Module 142 of the base 30, and the tether 40 to the controller module 128 of the UAV 10. Further the at least one control module 142 includes a network uplink 142a for uploading identification information on fishing conditions.

In an exemplary embodiment of the invention the marine drone system includes an electronic device having a processor 134 and a memory 136 in the control module 128 of the unmanned aerial vehicle 10. The memory 136 includes instructions stored thereon that, once executed by the processor 134, performs a plurality of steps, as may be seen in FIG. 8. The steps include initiating a hover mode 200 of flight, selecting at least one mode including following mode 202 and sense mode 204, and obtaining 206 a video feed 300 from a PTZ camera 106 if follow mode is selected, wherein once said video feed 300 is obtained 224, said mode initiating a tracking function 208 whereby said tracking function will track a watercraft 20, stream 222 video 300 of said tracking, display said video 226 feed on a display screen 52 of a graphic user interface 50. The steps further include providing a list of additional functions if sense mode 204 is selected, including options for monitoring water temperature 210, monitoring water depth 214, monitoring objects 218, and streaming video 222, wherein said monitoring water temperature includes obtaining 212 an output from an IR camera 108, said monitoring water depth includes obtaining 216 an output from a LIDAR sensor 112, said monitoring objects includes obtaining 220 an output from a radar 118, and said streaming video includes obtaining 224 an output from a PTZ camera 106.

The steps may continue by displaying 226 on a graphic user interface 50 of a screen 52 the video output 300 from said follow mode and said output from said sense mode. The steps may also continue by displaying 228/230 on said screen 52 the video 300 output from said follow mode or said output mode as an overlay layer with at least one of a map 302/304 or a camera feed 300 as a background layer, identifying 232 objects displayed on said screen 52, tapping 234, by way of user interaction, a screen location 342 representing said object, and selecting 236, from a list 356 of options, one option thereby executing a sub function of at least labeling 238 said object with an icon, and obtaining a distance 240 of said object or condition, whereby a laser pulses 242 and said distance is calculated 243 from the results of the laser 110 pulse, the beam angle of the laser 110, and outputs from sensors including a gyroscope 126, an accelerometer 124 for height, and a GPS 120 for exact location of said UAV 10, whereby the resulting information is displayed 226 on said screen 52.

An exemplary embodiment of the invention provides a method for a marine drone system. The method comprises providing a marine drone system, as recited above, and including an unmanned aerial vehicle 10 and a control module with screen 52 and graphic user interface 50. The method continues by displaying a menu 308 on said graphic user interface 50 that includes interactive locations for: i) displaying a video feed 310/344, ii) displaying depth information 312/346 from a LIDAR 112 output, and iii) displaying temperature information 314/348 from an infrared camera 108 output; and displaying a map 302/304. The method also includes the steps of selecting at least one of said interactive locations 310, 312, 314, 344, 346, 348, 350, 352, and 354 on said graphic user interface 50, displaying a water temperature when said location on said graphic user interface for water temperature 314/348 is tapped, displaying water depth when said location on said graphic user interface for water depth 312/346 is tapped, displaying objects 356 when said location on said graphic user interface for objects 342 is tapped, and displaying an HD video feed 300 when said location 310/344 on said graphic user interface 50 for HD video feed is tapped.

The claims herein are further incorporated in the teachings of the detailed specification.

While there has been shown and described above the preferred embodiment of the instant invention it is to be appreciated that the invention may be embodied otherwise than is herein specifically shown and described and that certain changes may be made in the form and arrangement of the parts without departing from the underlying ideas or principles of this invention as set forth in the Claims appended herewith.

I claim:

1. A method for a marine drone system, comprising:
   providing a marine drone system including an unmanned aerial vehicle and a control module with screen and graphic user interface, wherein said control module includes a processor configured to execute a program stored on a memory, wherein the memory further includes instructions stored thereon, wherein said instructions, once executed by said processor perform the steps of:
   initiating a hover mode of flight;
   selecting at least one mode including following mode and sense mode;
   obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface;
   providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera;
   displaying on a screen of a graphic user interface includes said output from said follow mode and said output from said sense mode;
   said displaying on said screen further includes displaying said output from said follow mode or said output mode as an overlay layer with at least one of a map or a camera feed as a background layer;
   identifying objects displayed on said screen;
   tapping, by way of user interaction, a screen location representing said object; and
   selecting, from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen;
   displaying a menu on said graphic user interface that includes interactive locations for:
   displaying a video feed;
   displaying depth information from a LIDAR output;
   displaying temperature information from an infrared camera output; and displaying a map;
   selecting at least one of said interactive locations on said graphic user interface;
   displaying a water temperature when said location on said graphic user interface for water temperature is tapped;
   displaying water depth when said location on said graphic user interface for water depth is tapped;
   displaying objects when said location on said graphic user interface for objects is tapped; and
   displaying an HD video feed when said location on said graphic user interface for HD video feed is tapped.

2. The method for a marine drone system, as recited in claim 1, wherein the marine drone system in said step of providing a marine drone system further includes:
   a container configured to be mountable on an upper surface of a watercraft, wherein said container further includes a means of supplying power to components of said marine drone system;
   an unmanned aerial vehicle; and
   a tether coupling said unmanned aerial vehicle to said container.

3. The method for a marine drone system, as recited in claim 2, wherein the tether of the marine drone system in said step of providing a marine drone system includes an electrical supply wiring and data wiring, wherein said tether supplies said unmanned aerial vehicle with power through said electrical supply wiring, and provides for a bi-directional communication link through said data wiring.

4. The method for a marine drone system, as recited in claim 3, wherein the marine drone system in said step of providing a marine drone system further includes:
- at least one control module providing an interactive graphic user interface on a display, wherein said control module includes a processor configured to execute a program stored on a memory, wherein said program is configured to:
  - show a video output;
  - show a visual radar output;
  - show a visual LIDAR output;
  - show a GPS location of said unmanned aerial vehicle;
  - show a GPS location of said graphic user interface;
- said at least one control module including means for relaying information between said unmanned aerial vehicle and said interactive graphic user interface; and
- said at least one control module including a network uplink for uploading identification information on fishing conditions.

5. A method for a marine drone system, comprising:
- providing a marine drone system including an unmanned aerial vehicle and a control module with screen and graphic user interface;
- displaying a menu on said graphic user interface that includes interactive locations for:
  - displaying a video feed;
  - displaying depth information from a LIDAR output;
  - displaying temperature information from an infrared camera output; and displaying a map;
- selecting at least one of said interactive locations on said graphic user interface;
- displaying a water temperature when said location on said graphic user interface for water temperature is tapped;
- displaying water depth when said location on said graphic user interface for water depth is tapped;
- displaying objects when said location on said graphic user interface for objects is tapped; and
- displaying an HD video feed when said location on said graphic user interface for HD video feed is tapped,
- wherein the marine drone system in said step of providing a marine drone system further includes:
  - a container configured to be mountable on an upper surface of a watercraft, wherein said container further includes a means of supplying power to components of said marine drone system;
  - an unmanned aerial vehicle; and
  - a tether coupling said unmanned aerial vehicle to said container;
- wherein the tether of the marine drone system in said step of providing a marine drone system includes an electrical supply wiring and data wiring, wherein said tether supplies said unmanned aerial vehicle with power through said electrical supply wiring, and provides for a bi-directional communication link through said data wiring;
- wherein the marine drone system in said step of providing a marine drone system further includes at least one control module providing an interactive graphic user interface on a display, wherein said control module includes a processor configured to execute a program stored on a memory, wherein said program is configured to:
  - show a video output;
  - show a visual radar output;
  - show a visual LIDAR output;
  - show a GPS location of said unmanned aerial vehicle; and
  - show a GPS location of said graphic user interface;
- wherein said at least one control module including means for relaying information between said unmanned aerial vehicle and said interactive graphic user interface; and
- wherein said at least one control module including a network uplink for uploading identification information on fishing conditions;
- wherein the unmanned aerial vehicle of said marine drone system in said step of providing a marine drone system further includes:
  - a weather-proof and water-proof casing;
  - a plurality of sensors coupled to said unmanned aerial vehicle, including at least one camera, at least one infrared camera, at least one radar module, at least one LIDAR module, at least one GPS module, and at least one bathymetric sensor;
  - a plurality of propellers capable of lifting said unmanned aerial vehicle and supporting the weight of said unmanned aerial vehicle and said tether; and
  - a laser, configured to communicate with at least one sensor in said plurality of sensors to obtain information from said sensor, and obtain a GPS coordinate location for objects detected by said at least one sensor and measured by said laser.

6. The method for a marine drone system, as recited in claim 5, wherein the memory of the control module of said unmanned aerial vehicle of said marine drone system in said step of providing a marine drone system further includes instructions stored thereon, wherein said instructions, once executed by said processor perform the steps of:
- initiating a hover mode of flight;
- selecting at least one mode including following mode and sense mode;
- obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface;
- providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera;
- displaying on a screen of a graphic user interface includes said output from said follow mode and said output from said sense mode;
- said displaying on said screen further includes displaying said output from said follow mode or said output mode as an overlay layer with at least one of a map or a camera feed as a background layer;
- identifying objects displayed on said screen;
- tapping, by way of user interaction, a screen location representing said object; and
- selecting, from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen.

7. The method for a marine drone system, as recited in claim 4, wherein the unmanned aerial vehicle of said marine drone system in said step of providing a marine drone system further includes:
a weather-proof and water-proof casing;
a plurality of sensors coupled to said unmanned aerial vehicle, including at least one camera, at least one infrared camera, at least one radar module, at least one LIDAR module, at least one GPS module, and at least one bathymetric sensor;
a plurality of propellers capable of lifting said unmanned aerial vehicle and supporting the weight of said unmanned aerial vehicle and a tether; and
a laser, configured to communicate with at least one sensor in said plurality of sensors to obtain information from said sensor, and obtain a GPS coordinate location for objects detected by said at least one sensor and measured by said laser.

8. An electronic device for a marine drone system, comprising:
a processor; and
a memory with instructions stored thereon, wherein said instructions, once executed perform the steps of:
initiating a hover mode of flight;
selecting at least one mode including following mode and sense mode;
obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface;
providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera;
displaying on a screen of a graphic user interface includes said output from said follow mode and said output from said sense mode;
said displaying on said screen further includes displaying said output from said follow mode or said output mode as an overlay layer with at least one of a map or a camera feed as a background layer;
identifying objects displayed on said screen;
tapping, by way of user interaction, a screen location representing said object; and
selecting, from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen.

9. A marine drone system, comprising:
a container configured to be mountable on an upper surface of a watercraft, wherein said container further includes a means of supplying power to components of said marine drone system;
an unmanned aerial vehicle;
a tether coupling said unmanned aerial vehicle to a said container; and
at least one control module with screen and graphic user interface, wherein said control module includes a processor configured to execute a program stored on a memory, wherein the memory further includes instructions stored thereon, wherein said instructions, once executed by said processor perform the steps of:
initiating a hover mode of flight;
selecting at least one mode including following mode and sense mode;
obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface;
providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera;
displaying on a screen of a graphic user interface includes said output from said follow mode and said output from said sense mode;
said displaying on said screen further includes displaying said output from said follow mode or said output mode as an overlay layer with at least one of a map or a camera feed as a background layer;
identifying objects displayed on said screen;
tapping, by way of user interaction, a screen location representing said object; and
selecting, from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen.

10. The marine drone system, as recited in claim 9, wherein said at least one control module with screen and graphic user interface includes a processor and a memory with a program stored thereon that, once executed by the processor provides for the steps of:
displaying a menu on said graphic user interface that includes interactive locations for:
displaying a video feed;
displaying water depth information from a LIDAR output;
displaying water temperature information from an infrared camera output;
displaying a map; and
displaying objects identified by a user, selecting at least one of said interactive locations on said graphic user interface;
displaying said water temperature information from said infrared camera output when said location on said graphic user interface for water temperature is tapped;
displaying said water depth information from said LIDAR output when said location on said graphic user interface for water depth is tapped;
displaying said objects identified by a user when said location on said graphic user interface for objects is tapped;
displaying said video feed when said location on said graphic user interface for the video feed is tapped; and
displaying said map when said location on said graphic user interface for the map is tapped.

11. The marine drone system, as recited in claim 10, wherein said program is further configured to:
show a visual radar output;
show a visual LIDAR output;
show a GPS location of said unmanned aerial vehicle; and
show a GPS location of said graphic user interface;
said at least one control module including means for relaying information between said unmanned aerial vehicle and said interactive graphic user interface; and
said at least one control module including a network uplink for uploading identification information on fishing conditions.

12. A marine drone system, comprising:
a container configured to be mountable on an upper surface of a watercraft, wherein said container further includes a means of supplying power to components of said marine drone system;
an unmanned aerial vehicle;
a tether coupling said unmanned aerial vehicle to a said container;
at least one control module with screen and graphic user interface;
wherein said at least one control module with screen and graphic user interface includes a processor and a memory with a program stored thereon that, once executed by the processor provides for the steps of:
displaying a menu on said graphic user interface that includes interactive locations for:
displaying a video feed;
displaying water depth information from a LIDAR output;
displaying water temperature information from an infrared camera output;
displaying a map; and
displaying objects identified by a user
selecting at least one of said interactive locations on said graphic user interface;
displaying said water temperature information from said infrared camera output when said location on said graphic user interface for water temperature is tapped;
displaying said water depth information from said LIDAR output when said location on said graphic user interface for water depth is tapped;
displaying said objects identified by a user when said location on said graphic user interface for objects is tapped;
displaying said video feed when said location on said graphic user interface for the video feed is tapped; and
displaying said map when said location on said graphic user interface for the map is tapped;
wherein said program is further configured to:
show a visual radar output;
show a visual LIDAR output;
show a GPS location of said unmanned aerial vehicle; and
show a GPS location of said graphic user interface;
wherein said at least one control module including means for relaying information between said unmanned aerial vehicle and said interactive graphic user interface;
wherein said at least one control module including a network uplink for uploading identification information on fishing conditions; and
wherein the unmanned aerial vehicle of said marine drone system further includes:
a weather-proof and water-proof casing;
a plurality of sensors coupled to said unmanned aerial vehicle, including at least one camera, at least one infrared camera, at least one radar module, at least one LIDAR module, at least one GPS module, and at least one bathymetric sensor;
a plurality of propellers capable of lifting said unmanned aerial vehicle and supporting the weight of said unmanned aerial vehicle and a tether; and
a laser, configured to communicate with at least one sensor in said plurality of sensors to obtain information from said sensor, and obtain a GPS coordinate location for objects detected by said at least one sensor and measured by said laser.

13. The marine drone system, as recited in claim 12, wherein the memory of the control module of said unmanned aerial vehicle of said marine drone system further includes instructions stored thereon, wherein said instructions, once executed by said processor perform the steps of:
initiating a hover mode of flight;
selecting at least one mode including following mode and sense mode;
obtaining a video feed from a PTZ camera if follow mode is selected, wherein once said video feed is obtained, said mode initiating a tracking function whereby said tracking function will track a watercraft, stream video of said tracking, display said video feed on a display screen of a graphic user interface;
providing a list of additional functions if sense mode is selected, including options for monitoring water temperature, monitoring water depth, monitoring objects, and streaming video, wherein said monitoring water temperature includes obtaining an output from an IR camera, said monitoring water depth includes obtaining an output from a LIDAR sensor, said monitoring objects includes obtaining an output from a radar, and said streaming video includes obtaining an output from a PTZ camera;
displaying on a screen of a graphic user interface includes said output from said follow mode and said output from said sense mode;
said displaying on said screen further includes displaying said output from said follow mode or said output mode as an overlay layer with at least one of a map or a camera feed as a background layer;
identifying objects displayed on said screen;
tapping, by way of user interaction, a screen location representing said object; and
selecting, from a list of options, one option thereby executing a sub function of at least labeling said object with an icon, and obtaining a distance of said object or condition, whereby a laser pulses and said distance is calculated from the results of the laser pulse, the beam angle of the laser, and outputs from sensors including a gyroscope, an accelerometer for height, and a GPS for exact location of said UAV, whereby the resulting information is displayed on said screen.

14. The marine drone system, as recited in claim 11, wherein the unmanned aerial vehicle of said marine drone system further includes:
a weather-proof and water-proof casing;
a plurality of sensors coupled to said unmanned aerial vehicle, including at least one camera, at least one infrared camera, at least one radar module, at least one LIDAR module, at least one GPS module, and at least one bathymetric sensor;
a plurality of propellers capable of lifting said unmanned aerial vehicle and supporting the weight of said unmanned aerial vehicle and a tether; and
a laser, configured to communicate with at least one sensor in said plurality of sensors to obtain information from said sensor, and obtain a GPS coordinate location for objects detected by said at least one sensor and measured by said laser.

15. The marine drone system, as recited in claim 9, wherein the tether includes an electrical supply wiring and data wiring, wherein said tether supplies said unmanned aerial vehicle with power through said electrical supply wiring, and provides for a bi-directional communication link through said data wiring.

* * * * *